Feb. 18, 1941.  R. R. McGREGOR  2,232,465

GRIT COATED GLASS BLOCK

Filed Aug. 18, 1939

INVENTOR.
Robt. R. McGregor
BY Brown, Critchlow & Flick
ATTORNEYS.

Patented Feb. 18, 1941

2,232,465

UNITED STATES PATENT OFFICE 2,232,465

GRIT COATED GLASS BLOCK

Rob R. McGregor, Swissvale, Pa., assignor to Corning Glass Works, Corning, N. Y., a corporation of New York Application August 18, 1939, Serial No. 290,818

4 Claims. (Cl. 72—41)

This invention relates to hollow glass building blocks of the type now used in constructing walls, partitions and other parts of buildings. These blocks, which are usually of rectangular form, are customarily laid in mortar, to effect a bond with which the practice is to provide the mortar-bearing faces of the blocks with a coating of material which adheres to the glass and with a superimposed rough surfaced coating of silica sand.

In service, breakages of glass building blocks have occurred from unknown causes. From investigations that I have made, I have found that at least some of the breakage has been due to the use of sand for the outer bonding layer. The hardness of the grains of sand is sufficient to cause scratching of the glass at the time the sand is applied, as well as during shipment of the blocks. Furthermore, as in the laying of ordinary brick, it is customary in the laying of glass building blocks to force them in place by striking them with the butts of trowel handles which may cause the sand to scratch the glass. I have found that these sand scratches are points where breaks in the blocks originate under the loads and stresses to which the blocks are subjected in service. The scratches may vary from one fourth of an inch in length to a size so small that they are discernible only under a microscope, but they are nevertheless sufficient to result in breakage of the blocks when subjected to service conditions.

The object of the invention is to provide a glass building block with a gritty coating which will not scratch the glass and cause the blocks to break in service.

Figure 1:
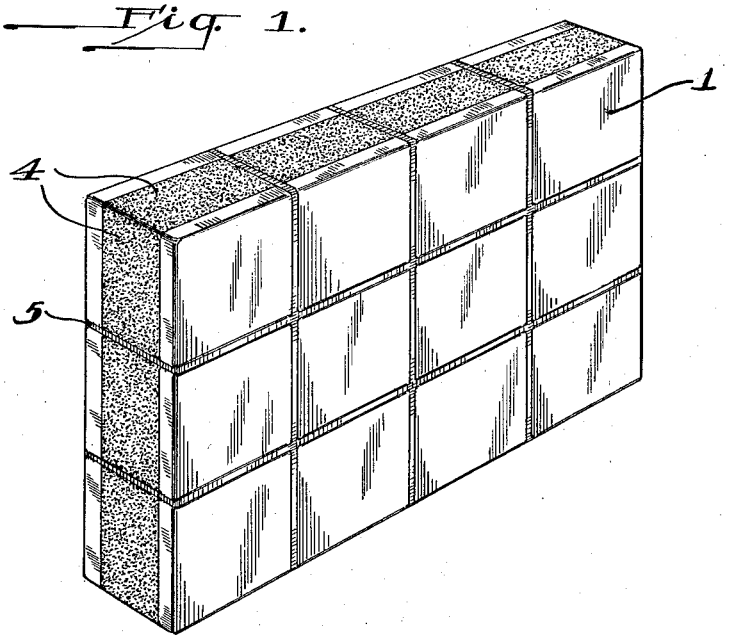
Figure 2:
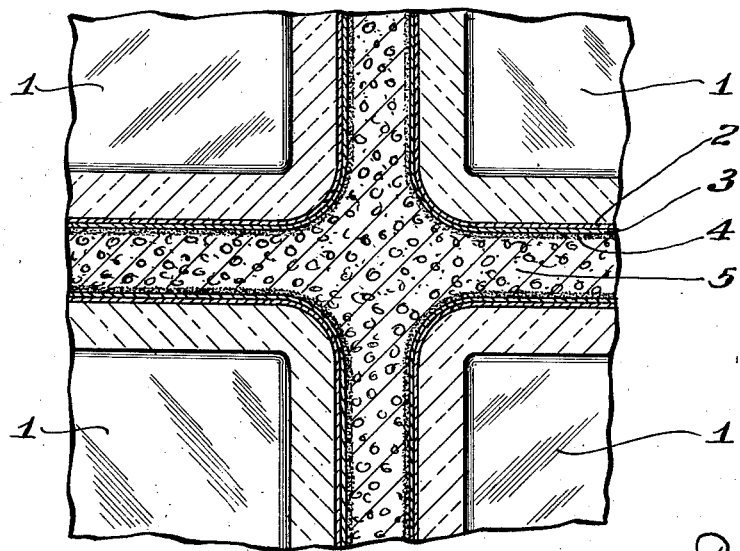

The invention is illustrated in the accompanying drawing, of which Fig. 1 is a perspective view of a portion of a panel or wall of glass building blocks embodying the invention, and Fig. 2 a central sectional view to larger scale through the adjacent corners of four such blocks.

In the practice of the invention, the mortar-bearing faces of a glass building block are first provided with a coating which is applied directly to the glass and which is adherent to it, and are then provided with a superimposed rough surfaced coating of granular material which has a hardness not greater than 4.5 on the Mohs' scale and which is bonded to the block by the first named coating. Also, the granular material has a hardness not less than 2.0 on the Mohs' scale.

The layer which is first applied to the mortar-bearing faces is preferably, although not necessarily, a polymerized material. In patent application Serial No. 268,640, filed April 18, 1939 by Earl L. Warrick and me, there is disclosed and claimed a glass building block having its mortar-bearing faces provided, among other things, with a layer formed of a mixture of ethyl silicate and vinyl acetate and a superposed layer of vinyl acetate. This forms a coating of polymerized material which has been found to adhere firmly to glass under the temperature and moisture conditions of service to which glass building blocks are subjected. While in the practice of my present invention various polymerized materials may be used, it is preferred to use that just explained.

As to the superimposed coating of granular material, I preferably use marble chips having a hardness of from about 3 to 4 on the Mohs' scale, although other materials may be used, as for example the following whose approximate hardness is set opposite each:

| | |
|---|---|
| Brucite | 2.5 |
| Cuprite | 3.5–4 |
| Sphalerite | 3.5–4 |
| Chalcopyrite | 3.5–4 |
| Fluorite | 4 |
| Zincite | 4.0–4.5 |

In Fig. 1 of the drawing there is shown a panel or a portion of a wall of blocks 1 embodying the invention. While the glass blocks may be variously manufactured, they are preferably formed from two pressed half blocks of rectangular form whose meeting edges are fused or otherwise sealed together to form a unitary structure. After the blocks are thus or otherwise formed, their mortar-bearing faces are first provided with a coating of polymerized material in liquid form. As previously stated, two such coatings are preferably applied, the first, indicated at 2 in Fig. 2, being a mixture of ethyl silicate and vinylite, and the second, indicated at 3, being vinyl acetate. Before the outer of these coatings sets, a layer of granular material of the character explained above is applied to it to bond the material to the block. The granular coating, indicated at 4, is thus superimposed upon the coating of polymerized material and forms a rough surface which facilitates bonding with mortar when the blocks are laid in the manner indicated in Fig. 1 with a layer of mortar 5 between their mortar-bearing faces.

The granular material, having a hardness not greater than 4.5 on the Mohs' scale, is incapable of scratching the glass. Accordingly, when the blocks are subjected to the loads and stresses which they encounter in service, they do not break by reason of the presence of scratches on their surfaces.

According to the provisions of the patent statutes, I have explained the principle of my invention and have illustrated and described what I consider to represent its best embodiment. However, I desire to have it understood that, within the scope of the appended claims, the invention may be practiced otherwise than as specifically illustrated and described.

I claim:

1. A glass building block having mortar-bearing faces provided with a coating applied directly to the glass and which is adherent thereto, and having a rough surfaced coating of granular material superimposed upon and bonded to the block by said first named coating, said granular material having a hardness not greater than 4.5 on the Mohs' scale.

2. A glass building block having mortar-bearing faces provided with a coating applied directly to the glass and which is adherent thereto, and having a rough surfaced coating of marble chips superimposed and bonded to the block by said first named coating.

3. A glass building block having mortar-bearing faces provided with a coating of polymerized material applied directly to the glass and which is adherent thereto, and having a rough surfaced coating of granular material superimposed upon and bonded to the block by said first named coating, said granular material having a hardness not greater than 4.5 on the Mohs' scale.

4. A glass building block having mortar-bearing faces provided with a coating of polymerized material applied directly to the glass and which is adherent thereto, and having a rough surfaced coating of marble chips superimposed upon and bonded to the block by said coating of polymerized material.

ROB R. McGREGOR.